US011733175B2

United States Patent
Chen et al.

(10) Patent No.: US 11,733,175 B2
(45) Date of Patent: Aug. 22, 2023

(54) ATMOSPHERIC AEROSOL INVERSION BASED ON STATISTICAL AND OTSU SEGMENTATION

(71) Applicant: University of Electronic Science and Technology of China, Chengdu (CN)

(72) Inventors: Yunping Chen, Chengdu (CN); Yue Yang, Chengdu (CN); Yan Chen, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/489,300

(22) Filed: Sep. 29, 2021

(65) Prior Publication Data

US 2022/0018787 A1 Jan. 20, 2022

Related U.S. Application Data

(63) Continuation of application No. 16/885,021, filed on May 27, 2020, now abandoned.

(30) Foreign Application Priority Data

May 29, 2020 (CN) .......................... 201910454155.5

(51) Int. Cl.
*G01N 21/94* (2006.01)
*G01N 21/3504* (2014.01)

(52) U.S. Cl.
CPC ......... *G01N 21/94* (2013.01); *G01N 21/3504* (2013.01)

(58) Field of Classification Search
CPC .......................... G01N 21/94; G01N 21/3504
See application file for complete search history.

(56) References Cited

U.S. PATENT DOCUMENTS

2017/0294011 A1\* 10/2017 Chen ........................ H04N 5/33

FOREIGN PATENT DOCUMENTS

| CN | 102636143 A | 8/2012 |
| CN | 104019753 A | 9/2014 |
| CN | 105674901 A | 6/2016 |

OTHER PUBLICATIONS

First Office Action for CN Application No. 201910454155.5, dated Sep. 28, 2022.

\* cited by examiner

*Primary Examiner* — Jamil Ahmed
(74) *Attorney, Agent, or Firm* — Billion & Armitage

(57) ABSTRACT

Embodiments include a method for retrieving atmospheric aerosol based on statistical segmentation. Firstly a multi-band remote sensing image including an apparent reflectance and an aerosol optical thickness look-up table corresponding to a retrieval band is obtained, then pixels are partitioned and screened according to apparent reflectance segments of a mid-infrared 2.1 micrometer band. After that the retained pixel sets are further partitioned and screened according to the apparent reflectance segments of the mid-infrared 1.6 micrometer band. Finally the obtained pixel sets are partitioned into two categories according to the pixel number, one category including pixels having more pixels, the other including those with less pixels. The category with more pixels is taken as the reference part for retrieval.

6 Claims, 7 Drawing Sheets

Figure 1:
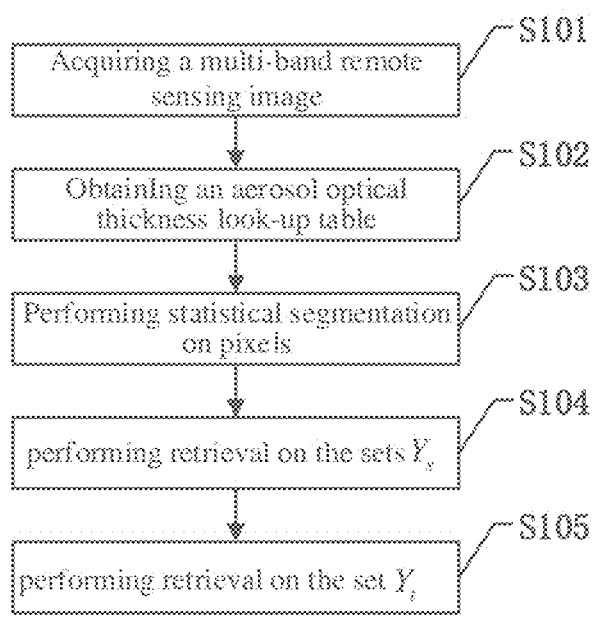

(a) Overall partitioning      (b) Partial partitioning apparent reflectance in Band1

ATMOSPHERIC AEROSOL INVERSION BASED ON STATISTICAL AND OTSU SEGMENTATION

This application is a Continuation of U.S. application Ser. No. 16/885,021, filed on May 27, 2021, which claims the benefit of the Chinese Patent Application No. 201910454155.5, filed on May 29, 2019, which is incorporated herein by reference in its entirety.

TECHNICAL FIELD

The present invention relates to the field of information remote sensing technologies, and more particularly to a method for retrieving atmospheric aerosol based on statistical segmentation.

BACKGROUND

The atmospheric aerosol is a multi-phase system formed by atmosphere as well as solid and liquid particles suspending therein. It is a mixture consisting of molecular groups and liquid or solid particles suspending in the air and having certain stability, a small sedimentation rate, and a size ranging from one micrometer to dozens of micrometers. Aerosol particles mainly originate from artificial sources such as industrial activities, biological burning and the like, as well as natural sources such as dusts, offshore marine particles and the like.

Research shows that the atmospheric aerosol not only affects radiation balance of an earth surface layer system, but also causes the earth-atmosphere system to cool by adjusting a reflectivity of an earth atmosphere system through scattering solar shortwave radiation. It also causes a heating process through absorbing the solar radiation, and changes microphysical properties of clouds by affecting the microphysical process of formation of the clouds. Aerosol also significantly influences atmospheric chemical processes and biogeochemical cycle. At the same time, the aerosol particles contain some particles harmful to human body, which may cause serious problem to the health of human beings, especially in heavily populated urban areas with many industries. Therefore, retrieval of the atmospheric aerosol has a significant meaning to research of global climate change as well as monitoring and management of atmospheric pollution.

Currently, researchers home and abroad have made quite some achievements in terms of aerosol remote sensing retrieval. They also pay much attention to monitoring of the aerosol in designing novel sensors. However, most of the conventional retrieval algorithms are directed to large-size aerosol having average properties, and quite limited in terms of applications. For example, such algorithms are only adapted to dark ground surface. At present, there is no effective aerosol retrieval algorithm adapted to bright ground surface areas such as cities.

SUMMARY

An object of the present invention is to provide a method for retrieving atmospheric aerosol based on statistical segmentation. Two parts are partitioned by way of statistical segmentation, and aerosol thickness values thereof are retrieved using different methods, thereby improving accuracy and resolution of the retrieval result of the bright ground surface area.

In order to meet the above-mentioned objective of the present invention, the method for retrieving atmospheric aerosol based on statistical segmentation in the present invention comprises steps of:

S1: acquiring a multi-band high-resolution remote sensing image of an analyzed area using satellites, and performing radiometric calibration to obtain a multi-band remote sensing image comprising an apparent reflectance, wherein the multi-band remote sensing image comprises a mid-infrared 1.6 micrometer band and a mid-infrared 2.1 micrometer band, and selecting a blue/costal band from the multi-band remote sensing image as an retrieval band;

S2: inputting the multi-band remote sensing image into an atmospheric radiative transfer model, obtaining a corresponding aerosol optical thickness look-up table according to the retrieval band, wherein the look-up table comprises parameters corresponding to each aerosol optical thickness value AOT for calculating the apparent reflectance;

S3: for all pixels in the multi-band remote sensing image, performing categorization using a statistical segmentation method, wherein the segmentation method comprises steps of:

S3.1: partitioning an apparent reflectance range of the mid-infrared 2.1 micrometer band into N segments $\varphi_n$, n=1, 2, ..., N, according to a predetermined interval $\lambda_1$;

S3.2: based on apparent reflectances of respective pixels in the multi-band remote sensing image in the mid-infrared 2.1 micrometer band, allocating the respective pixels into corresponding segments, to obtain pixel sets $x_n$ corresponding to respective segments $\varphi_n$;

$x_n$ obtained in step S3.2, in condition that a number of pixels in the pixel set $x_n$ $|x_n| \geq T_1$, $T_1$ otherwise deleting the pixel set; marking retained pixel sets as $x_{n'}$, n'=1, 2, ..., N', N' being a number of retained pixel sets;

S3.4: partitioning an apparent reflectance range of the mid-infrared 1.6 micrometer band into M segments $\gamma_m$, m=1, 2, ..., M according to a predetermined interval $\lambda_2$;

S3.5: based on apparent reflectances of pixels in each pixel set $x_{n'}$ in the mid-infrared 1.6 micrometer band, allocating respective pixels to a corresponding segment, to obtain pixel sets $y_{n',m}$ corresponding to respective segments $\gamma_m$ in the pixel sets;

S3.6: in condition that a number of pixels in the pixel set $y_{n',m}$ $|y_{n',m}| \geq T_2$, $T_2$ being a predetermined threshold value, retaining the pixel set $\gamma_{n',m}$, otherwise deleting it; marking retained pixel sets as $y_k$, k=1, 2, ..., K, K being a number of the retained pixel sets;

S3.7: when an apparent reflectance of a pixel in the pixel set $y_k$ in the blue/coast band $\rho_{y_{k,i}} < T$, i=1, 2, ..., $|y_k|$, $|y_k|$ being the number of pixels in the set $y_k$, T being an OTSU threshold of the apparent reflectance of the pixel set $y_k$ in the blue/coast band, allocating the pixel into a target set $Y_s$, otherwise allocating the pixel to an error categorization set $Y_t$;

S4: for the target set $Y_s$, acquiring the aerosol optical thickness value AOT of each pixel through the steps of:

S4.1: marking a p-th pixel set in the set $Y_s$ as $y_{s,p}$, p=1, 2, ..., $|Y_s|$, $|Y_s|$ being a number of pixel sets in the set $Y_s$, for each pixel set $y_{s,p}$, acquiring a pixel $y_{s,p,min}$ with the minimum apparent reflectance in the blue/coast band, the pixel $y_{s,p,min}$ being a clean pixel;

S4.2: setting an aerosol optical thickness value AOT of the clean pixel as $\varepsilon$, $\varepsilon$ being a preset minimum value, retrieving a ground surface reflectivity of the clean pixel $t_{s,p,min}$ from the aerosol optical thickness look-up table generated in S2; setting ground surface reflectivities of all pixels in the pixel set $y_{s,p}$ as being equal to the ground surface reflectivity of the clean pixel $y_{s,p,min}$;

S4.3: retrieving aerosol optical thickness values AOTs of all pixels in the target set $Y_s$.

S5: performing retrieval on the error categorization set $Y_t$ through the steps of:

S5.1: traversing all pixels in the set $Y_s$, to search for pixels with no values within a predetermined radius, designating an aerosol thickness value of a pixel with no value as the aerosol thickness value of the pixel, and marking a set comprising all designated pixels as $P_s$;

S5.2: for each pixel in the set $P_s$, obtaining parameters corresponding to the designated aerosol optical thickness value from the aerosol optical thickness look-up table, and then calculating and obtaining a ground surface reflectivity of the pixel according to the apparent reflectance;

S5.3: gridding the multi-band remote sensing image according to a predetermined side length;

S5.4: marking a q-th pixel set in the set $Y_t$ as $y_{t,q}$, $q=1, 2, \ldots, |Y_t|$, $|Y_t|$ being a number of the pixel sets in the set $Y_t$; for each pixel set $y_{t,q}$, finding an intersection with $P_s$ from each grid partitioned in step S5.3, and setting the ground surface reflectivity of all pixels of the pixel set $y_{t,q}$ in a current grid as being equal to an average ground surface reflectivity value of all pixels in the intersection;

S5.5: performing aerosol thickness value retrieval on each pixel assigned with the ground surface reflectivity in the step S5.4, to obtain the aerosol thickness value of the pixel.

In the method for retrieving atmospheric aerosol based on statistical segmentation in the present invention, the aerosol optical thickness look-up table of the retrieval band are obtained first, then the pixels are partitioned and screened according to the apparent reflectance segments of the mid-infrared 2.1 micrometer band. After that the retained pixel sets are further partitioned and screened according to the apparent reflectance segments of the mid-infrared 1.6 micrometer band. Finally the obtained pixel sets are partitioned into two categories according to the respective OTSU threshold for apparent reflectance in the coast band, with pixels smaller than the threshold in one category, and the remaining pixels in another category. The category with pixels smaller than the threshold is taken as the target set for retrieval. Specifically, each of the pixel sets are first searched for the clean pixel, then the ground surface reflectivity of the clean pixel is taken as the ground surface reflectivity of the whole pixel set, thereby obtaining the aerosol optical thickness value through retrieval. After that these pixels are taken as references to perform retrieval on the other category.

The present invention adopts a novel method when calculating the ground surface reflectivity. According to this method, the ground surface reflectivity is determined according to the clean pixel, instead of depending on a dark pixel. Therefore, as long as completion of the statistical segmentation is satisfied, the retrieval can be performed. Consequently, the present invention also has good retrieval effect for bright ground surface area, and has wider applicability compared with the conventional dark pixel algorithm.

BRIEF INTRODUCTION OF THE ACCOMPANYING DRAWINGS

Figure 2:
Figure 3:
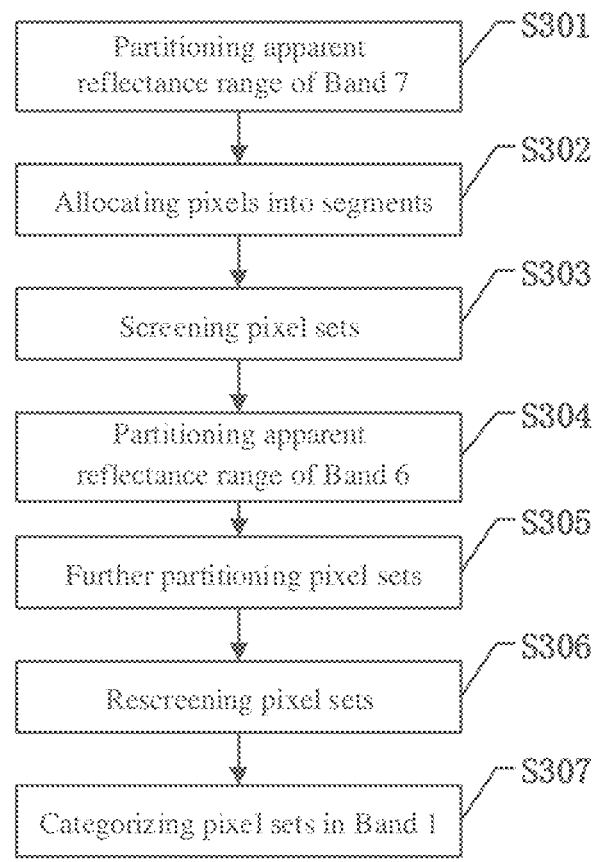
Figure 4:
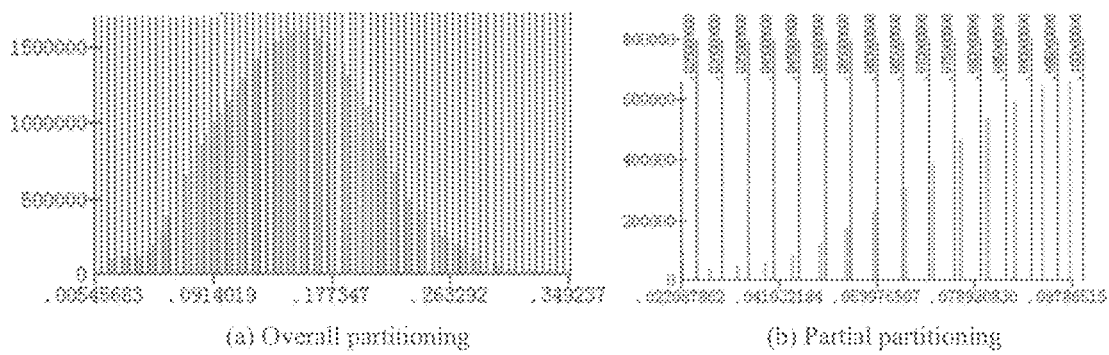
Figure 5:
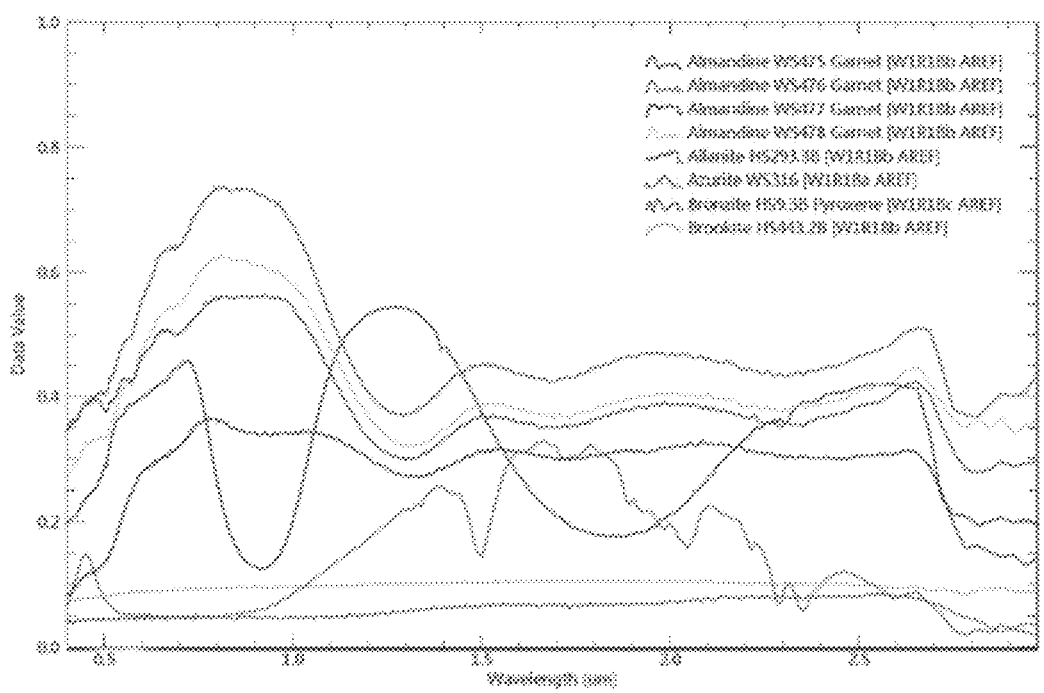
Figure 6:
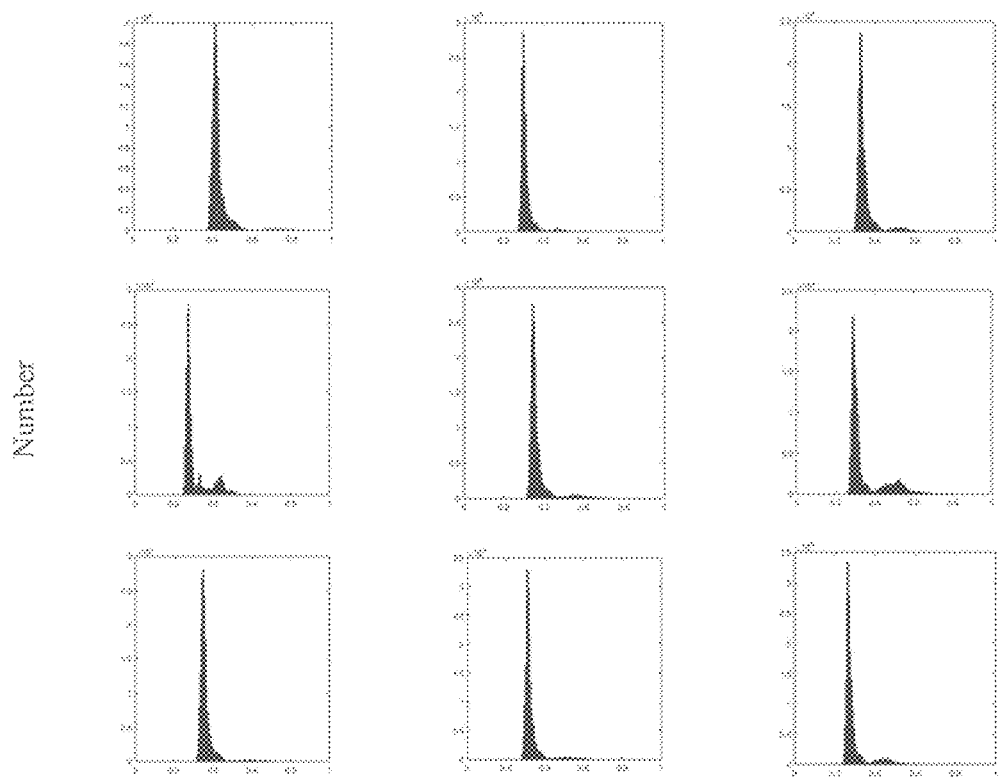

FIG. 1 schematically illustrates a flow chart of a method for retrieving atmospheric aerosol based on statistical segmentation in accordance with an embodiment of the present invention;

FIG. 2 is a diagram of an image used in the present example;

FIG. 3 schematically illustrates a flow chart of statistical segmentation in accordance with an embodiment of the present invention;

FIG. 4 schematically illustrates partitioning pixels of Band 7 in accordance with an embodiment of the present invention;

FIG. 5 schematically illustrates spectral curves of ground surface reflectivity;

FIG. 6 is a partial histogram of an apparent reflectance of a pixel set $y_k$ in Band 1.

Figure 7:
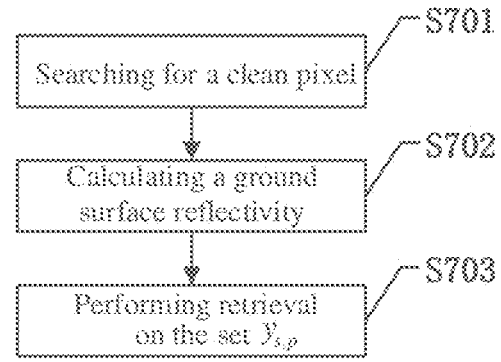
Figure 8:
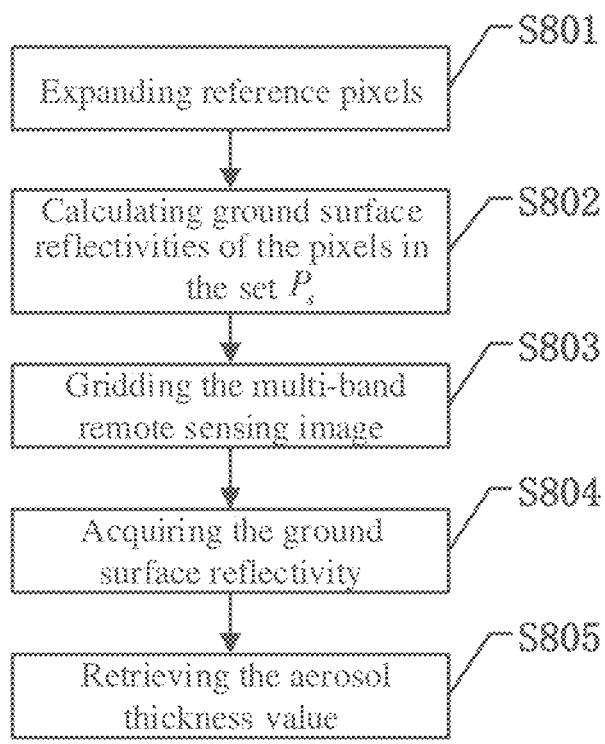
Figure 9:
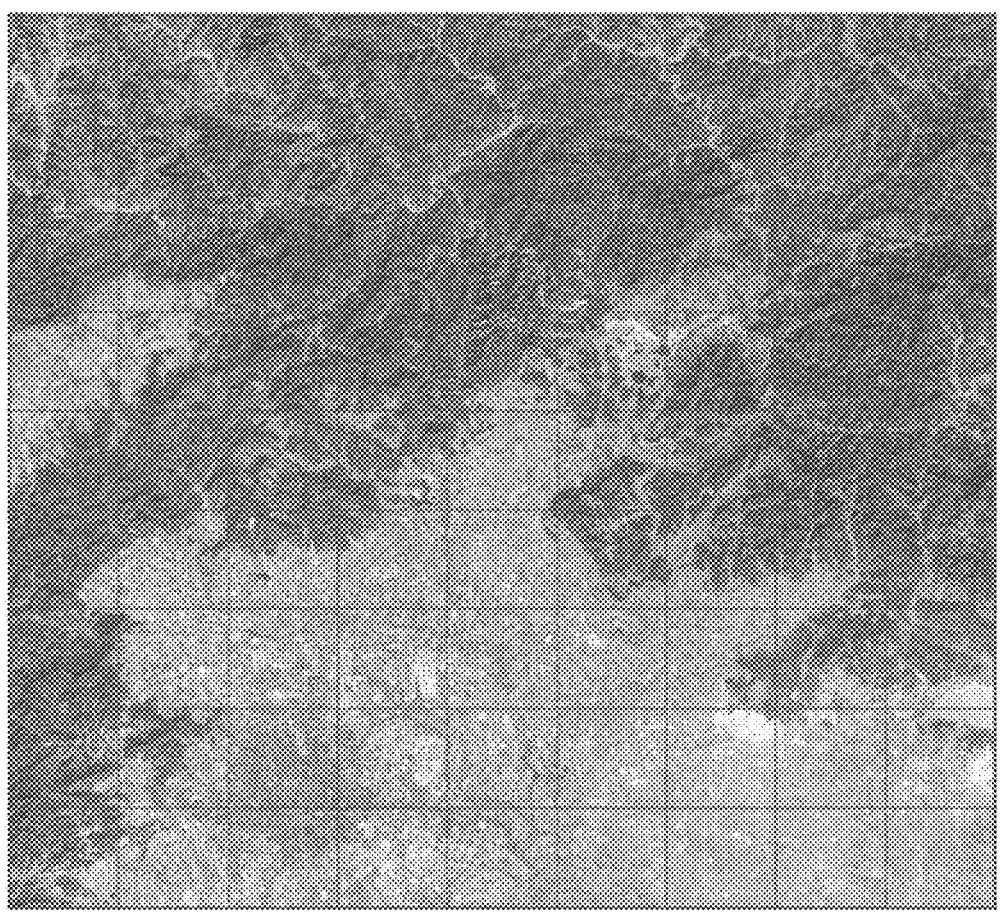
Figure 10:
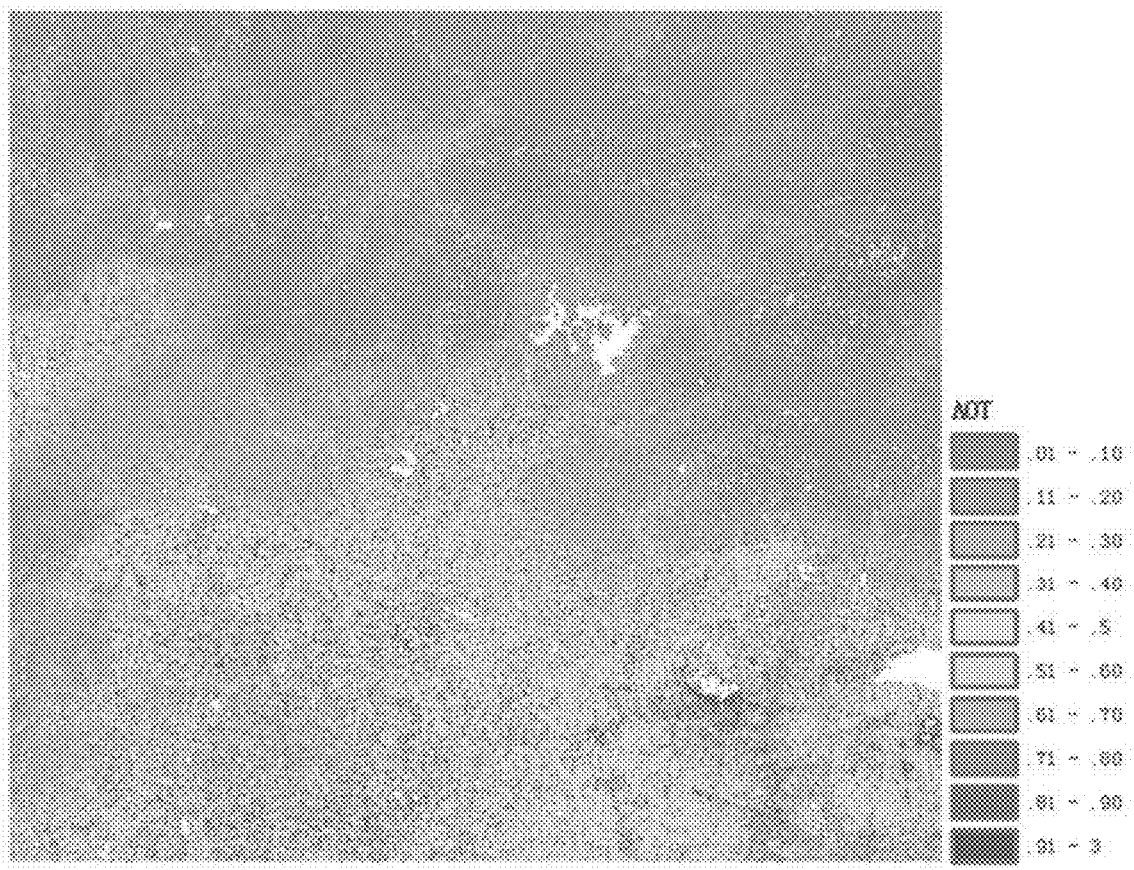

FIG. 7 schematically illustrates a flow chart of performing retrieval on each pixel set $y_{s,p}$ in the set $Y_s$;

FIG. 8 schematically illustrates a flow chart of performing retrieval on the set $Y_t$;

FIG. 9 schematically illustrates a gridding result of the image shown in FIG. 2; and FIG. 10 schematically illustrates a result of retrieving a multi-band remote sensing image shown in FIG. 2 according to the present invention.

DETAILED DESCRIPTION OF THE INVENTION

In the following, specific embodiments of the present invention will be described in detail with reference to the accompanying drawings such that a person skilled in the art can better understand the invention. In the following description, it is noted that well-known functions and configurations are not described in detail to avoid obscuring the present invention.

Embodiments

FIG. 1 is a flow chart of a method for retrieving atmospheric aerosol based on statistical segmentation according to an embodiment of the present invention. As shown in FIG. 1, the method for atmospheric aerosol retrieval based on statistical segmentation comprises the following steps:

S101: acquiring a multi-band remote sensing image.

A multi-band high-resolution remote sensing image of an analyzed area is acquired through satellites, and radiometric calibration is performed to obtain a multi-band remote sensing image comprising an apparent reflectance. The multi-band remote sensing image comprises a mid-infrared 1.6 micrometer band and a mid-infrared 2.1 micrometer band, and a blue/coast band is selected from the multi-band remote sensing image as a retrieval band.

Currently the LANDSAT satellite is used to acquire the multi-band high-resolution remote sensing image. In a LANDSAT 8 OLI image there are 11 bands, namely, Band1 costal band, Band2 blue band, Band3 green band, Band4 red band, Band5 near-infrared band, Band6 mid-infrared 1.6 micrometer band, Band7 mid-infrared 2.1 micrometer band, Band8 full-color band, Band9 cirrus band, Band10 thermal infrared band 1, and Band11 thermal infrared band 2. Band6 mid-infrared band and Band7 mid-infrared band are used in the present invention. The retrieval band selected in the present example is Band1, this is because Band1 in the LANDSAT 8 OLI image is more sensitive to the aerosol, and can therefore improve the retrieval accuracy.

An image taken on the $42^{nd}$ day of the year 2015 in Beijing is used in the present example. FIG. 2 is the image used in the present example. As shown in FIG. 2, this image includes bright ground surface areas (with relatively light-color).

S102: acquiring an aerosol optical thickness (AOT) look-up table.

The multi-band remote sensing image obtained in step S101 is input into an atmospheric radiative transfer model, thereby arriving at a corresponding aerosol optical thickness look-up table according to the retrieval band. The look-up table includes parameters corresponding to each aerosol thickness value AOT for calculating the apparent reflectance. In the present example, assuming that an underlying surface is a Lambertian surface, its apparent reflectance $\rho_{TOA}$ is calculated as:

$$\rho_{TOA} = \rho_0 + \frac{T_s \cdot T_v \cdot \rho_s}{1 - \rho_s \cdot S}.$$

where $\rho_0$ is an atmospheric path radiation reflectivity, $\rho_s$ is a ground surface reflectivity, S is a downward hemispherical emissivity of a lower atmospheric layer, $T_s$ is a total transmittance of incident light from top of the atmosphere to the ground surface, $T_v$ is a total transmittance of light upwardly entering a satellite sensor field. Therefore it can be seen that in the present example the parameters which need to be included in the look-up table include the atmospheric path radiation reflectivity, the atmosphere hemispherical emissivity, and a product of the total transmittance of the incident light from the top of the atmosphere to the ground surface and the total transmittance upwardly entering a satellite sensor field.

Currently, there are many atmospheric radiative transfer models. In the embodiment, the most common 6S radiative transfer model is used. In addition to the multi-band remote sensing image, other parameters that need to be input into the 6S radiative transfer model include: date, zenith angle, and azimuth angle corresponding to the multi-band remote sensing image, an aerosol type and atmosphere mode, a step size of the aerosol optical thickness value and so on. The atmosphere mode selected in the present example is mid-latitude winter, the aerosol type is a continental type, and the selected retrieval band is Band1 costal band. Table 1 is a look-up table acquired in the present example.

TABLE 1

| AOT | $P_0$ | S | $T_s \cdot T_v$ |
|---|---|---|---|
| 0.01 | 0.07883 | 0.78547 | 0.13188 |
| 0.02 | 0.08103 | 0.77265 | 0.13571 |
| ... | ... | ... | ... |
| 2.99 | 0.24536 | 0.06927 | 0.29881 |

S103: performing statistical segmentation on the pixels.

For all pixels in the multi-band remote sensing image, segmentation is performed using a statistical segmentation method. As the mid-infrared 1.6 micrometer band and mid-infrared 2.1 micrometer band have relatively long wavelengths, and they are not susceptible to aerosol interference. Therefore, the apparent reflectances of the mid-infrared 1.6 micrometer band and the mid-infrared 2.1 micrometer band are used to segment the pixels in the present invention, and aerosol optical thickness value retrieval is performed with the costal band. Since the LANDSAT 8 OLI image is used in the present example, the mid-infrared 1.6 micrometer band is Band6, the mid-infrared 2.1 micrometer band is Band1, and the costal band is Band1.

FIG. 3 is a flow chart of categorizing pixels in accordance with an embodiment of the present invention. As shown in FIG. 3, categorizing pixels in the present invention comprises the following steps.

S301: partitioning the apparent reflectance of Band 7 into segments.

The apparent reflectance range of Band7 is partitioned into N segments $\varphi_n$, n=1, 2, . . . , N, according to a predetermined interval $\lambda_1$. The partitioning interval $\lambda_1$ can be determined as needed. Generally, the interval $\lambda_1$ is within a range of $0.002 \leq \lambda_1 \leq 0.01$.

S302: allocating the pixels.

Based on apparent reflectances in Band7 of respective pixels of the multi-band remote sensing image, the pixels are allocated to corresponding segments, to obtain pixel sets $x_n$ corresponding to respective segments $\varphi_n$. Assuming that an apparent reflectance of a pixel at Band7 is marked as $\rho$, then a serial number of its corresponding segment will be $\lceil \rho/\lambda \rceil$, $\lceil \ \rceil$ is rounding up to an integer.

FIG. 4 is a diagram illustrating partitioning part of the pixels of Band7 at an interval of 0.005 in the present example. FIG. 4(a) is an overall diagram of the partitioning, and FIG. 4(b) is a partial diagram of the partitioning. As shown in FIG. 4, by partitioning the apparent reflectance range of Band7 into segments, the pixels in the multi-band remote sensing image can be partitioned into segments.

S303: screening pixel sets.

N pixel sets $x_n$ obtained in step S302 are evaluated one by one. If a number of pixels in the pixel set $x_n |x_n| \geq T_1$, $T_1$ being a predetermined threshold value, this pixel set is retained, otherwise it is deleted. The retained pixel sets are marked as $x_{n'}$, n'=1, 2, . . . , N', N' is the number of the pixel sets retained after the screening. The value of the threshold $T_1$ may also be set as needed. Apparently, the higher the resolution of the multi-band remote sensing image and the larger the interval $\lambda_1$ is, and the more pixels are included in each segment. Correspondingly, the threshold value $T_1$ may also be set to be slightly higher, otherwise the threshold value $T_1$ may be set to be slightly lower. In the present example, $T_1$=100000.

S304: partitioning the apparent reflectance of Band6 into segments.

The apparent reflectance range of Band6 is partitioned into M segments $\gamma_m$, m=1, 2, . . . , M, according to a predetermined interval $\lambda_2$. Likewise, the partitioning interval $\lambda_2$ can be determined as needed, and may be within the range of $0.002 \leq \lambda_2 \leq 0.01$.

S305: further partitioning the pixel sets.

Each pixel set $x_{n'}$ retained in step S303 is further partitioned. The further partitioning may be performed in the following way: each pixel within each pixel set $x_{n'}$ is allocated into a corresponding segment $\gamma_m$ according to an apparent reflectance of the pixel at Band6, to obtain a pixel set $\gamma_{n',m}$ in corresponding to respective segment $\gamma_m$ in this pixel set. Apparently, after further partitioning the pixel sets, N'×M pixel sets in total are obtained.

S306: re-screening the pixel sets.

The N'×M pixel sets obtained in step S305 are screened again. If a number of pixels in the pixel set $y_{n',m}|y_{n',m}| \geq T_2$, $T_2$ being a predetermined threshold value, this pixel set is retained, otherwise it is deleted. The pixel set retained after the screening is marked as $y_k$, k=1, 2, . . . , K, K is the number of the pixel sets retained after the screening. Like the threshold value $T_1$, the threshold value $T_2$ may also be set as needed. Since the pixel set $y_{n',m}$ is a pixel set obtained after further partitioning, the number of pixels in the pixel set $y_{n',m}$ will definitely be less, therefore $T_2$ is definitely smaller than $T_1$. In the present example, $T_2=5000$.

S307: categorizing the pixel sets in Band1.

The K pixel sets $y_k$ obtained after screening in step S306 are categorized according to an OTSU threshold T and an apparent reflectance of each set $y_k$ in Band1. If a pixel in the pixel set $y_k$ has an apparent reflectance $\rho_{y_{k,i}}<T$, i=1, 2, ..., $|y_k|$, where $|y_k|$ denotes a number of pixels in the pixel set $y_k$, the pixel $y_{k,i}$ is categorized into a target set $Y_s$, otherwise it is categorized into an error categorization set $Y_t$.

The pixels in the multi-band remote sensing image are segmented according to the apparent reflectances of Band6 and Band1 through the above steps, and get the final categorization result in Band1. FIG. 5 schematically illustrates spectral curves of ground surface reflectivities. FIG. 5 shows spectral curves of ground surface reflectivities of some objects in an ENVI standard spectrum database. It can be seen by studying spectral curves of a lot of objects that the same or different objects may have different ground surface reflectivity curves under different conditions, and the reflectivity curves may overlap with each other at the mid-infrared 1.6 micrometer band and the mid-infrared 2.1 micrometer band. However, it rarely happens like this, especially for regular objects, and the categorization error can be further reduced by the subsequent OTSU threshold method. FIG. 6 is a partial histogram of the apparent reflectance of the pixel set in Band 1. FIG. 6 shows that after twice segmentation, the histogram of the apparent reflectance of the pixels in the pixel set in Band1 has a multivariate normal distribution, and there is a clear highest peak. The study has found that the pixels corresponding to the highest peak are correctly categorized pixels, and the remaining short peaks are erroneously categorized pixels. Therefore, these two types of pixels are separated by the OTSU threshold method. Therefore, although there may be errors in the categorization method used in the present invention, the pixels in the multi-band remote sensing image can still be partitioned into many segments using the mid-infrared 1.6 micrometer band and the mid-infrared 2.1 micrometer band, and the result is further improved by the OTSU threshold method. If no error exists in these categorization results, eventually, the pixels belonging to the same segment should have approximately the same ground surface reflectivity curve, and their ground surface reflectivities at the retrieval band should be approximately equal.

S104: performing retrieval on the sets $Y_s$.

In the present invention, the sets $Y_s$, taken as a reference set, are processed using a method of retrieving polluted pixels based on clean pixels.

In the retrieval of aerosol, it is very important to obtain the ground surface reflectivity. It is shown by experiments that each pixel segment in the target sets $Y_s$ has few errors, this is mainly because each pixel set in the target sets $Y_s$ is the same type of regular object, for example, vegetation and bare earth and so on. In the meantime, some errors can be further eliminated by the OTSU threshold method. Moreover, the probability that each pixel set in $Y_s$ containing clean pixels is relatively high. The p-th pixel set in $Y_s$ is denoted as $y_{s,p}$, p=1, 2, ..., $|Y_s|$, $|Y_s|$ being a number of the pixel sets in the sets $Y_s$. Thus, as long as the ground surface reflectivities of the clean pixels in each pixel set are obtained, the ground surface reflectivities of all pixels in the pixel set can be obtained. Therefore, it is necessary to obtain the ground surface reflectivities of the clean pixels in each pixel set first.

FIG. 7 is a diagram illustrating a flow chart of retrieving each pixel set $y_{s,p}$ in the sets $Y_s$. As shown in FIG. 7, a detailed method for retrieving the pixel set $y_{s,p}$ is as follows.

S701: searching for a clean pixel.

For each pixel set $y_{s,p}$ in the set $Y_s$, a pixel with the minimum apparent reflectance in Band1 is searched out. The minimum value cannot be less than or equal to 0, and it is recorded as a clean pixel $y_{s,p,min}$.

S702: calculating the ground surface reflectivity.

Assuming that the aerosol thickness value AOT of the clean pixel $y_{s,p,min}$ is ε, where ε is a preset minimum value, various parameters corresponding to the aerosol optical thickness value ε are searched out from the aerosol optical thickness look-up table generated in S102. The ground surface reflectivity is calculated based on the apparent reflectance of the clean pixel $y_{s,p,min}$. In the present embodiment, ε=0.01.

S703: performing retrieval on the set $y_{s,p}$.

It can be seen from the previous analysis that the ground surface reflectivity corresponding to the clean pixel $y_{s,p,min}$ is actually the ground surface reflectivity of the whole pixel set $y_{s,p}$. Therefore, it can be used to retrieve the aerosol optical thickness value of each pixel in the pixel set $y_{s,p}$. The retrieval method may be selected as needed. A retrieval method used in the present example is as follows:

obtaining parameters corresponding to each aerosol thickness value AOT from the look-up table, and calculating an apparent reflectance $\rho_i$ corresponding to each aerosol thickness value AOT, where i=1, 2, ..., L, L is the number of the aerosol thickness value in the look-up table.

For each pixel, an apparent reflectance closest to its apparent reflectance is searched from the L apparent reflectances $\rho_i$, and an aerosol thickness value AOT corresponding thereto is just the aerosol thickness value of this pixel.

S105: performing retrieval on the set $Y_t$.

$Y_s$ in step S104 to obtain the aerosol optical thickness value of each pixel, retrieval for the pixels in the set $Y_t$ is performed by taking the pixels in the set $Y_s$ as references. FIG. 8 is a flow chart of performing retrieval on the set $Y_t$. As shown in FIG. 8, detailed steps of performing retrieval on the set $Y_t$ are as follows.

S801: expanding reference pixels.

Each pixel in the set $Y_s$ is traversed, to search for pixels with no value within a predetermined radius. The aerosol thickness value of this pixel is designated as aerosol thickness values of the pixels with no value. A pixel set of all filled and assigned pixels is marked as $P_s$. The searching radius r is generally set as needed, and the smaller the radius is, the more precise the filled aerosol thickness value will be, though the number of pixels remained with no value will be increased. Generally, the searching radius r is within the range of $1 \leq r \leq 10$.

S802: calculating the ground surface reflectivities of the pixels in the set $P_s$.

For each pixel in the set $P_s$, parameters corresponding to the filled aerosol thickness value are obtained from the aerosol optical thickness look-up table, and then the ground surface reflectivity of this pixel is calculated and obtained according to the apparent reflectance.

S803: gridding the multi-band remote sensing image.

Considering that the objects have certain correlation in geographic space, the multi-band remote sensing image is partitioned into grids according to a predetermined side length. The predetermined side length can be set according to a resolution of the multi-band remote sensing image. FIG. 9 is a gridding result of the image shown in FIG. 2.

S804: acquiring the ground surface reflectivity.

A q-th pixel set in the set $Y_t$ is marked as $y_{t,q}$, q=1, 2, ..., $|Y_t|$, $|Y_t|$ representing the number of the pixel sets in the set $Y_t$. For each pixel set $y_{t,q}$, an intersection with $P_s$ is obtained for each grid partitioned in step S803. Then the ground surface reflectivity of all pixels of the pixel set $y_{t,q}$ in the current grid is set to be equal to an average ground surface reflectivity value of all pixels in this intersection. Thus, the ground surface reflectivities of the pixels in the set $Y_t$ are obtained.

S805: retrieving the aerosol thickness value.

Aerosol thickness value retrieval is performed for each pixel assigned with the ground surface reflectivity in step S804, to obtain the aerosol thickness value of this pixel.

Since the pixel sets are screened in step S103 in the present invention, the sets $Y_s$ and $Y_t$ do not contain all pixels of the multi-band remote sensing image, neither can retrieval be performed on all of the pixels in step S105. A number of the remaining pixels with no value can be reduced by adjusting the threshold of each segment or adjusting the grid size, so the remaining pixels with no value have little effect on the overall retrieval result. FIG. 10 schematically illustrates a retrieval result for the multi-band remote sensing image shown in FIG. 2 using the present invention, in which the blank portion represents pixels with no value or water pixels. It can be seen from the result shown in FIG. 10 that the present invention also has good retrieval effect for bright ground surface areas, and therefore has a wider applicability compared with the conventional dark pixel algorithm.

In order to prove the accuracy of the present invention, data of AERONET (Aerosol Robotic Network) ground observation network is downloaded from the website http://aeronet.gsfc.nasa.gov/. The retrieval results of the present invention are compared with the ground observation data and the retrieval results of the dark pixel algorithm, and two selected sites are both located in the city, i.e. belonging to bright ground surface areas. Table 2 shows comparison of the retrieval results of the present invention, the dark pixel algorithm retrieval results and the ground surface observation data of the graph as shown in FIG. 2.

TABLE 2

| Site | Beijing | Beijing-RADI |
|---|---|---|
| Observation data | 0.1393 | 0.1575 |
| Retrieval result of dark pixel method | 0.66 | 0.64 |
| Retrieval result of the present invention | 0.21 | 0.47 |
| Error of the dark pixel method | 0.5207 | 0.4825 |
| Error of the present invention | 0.0707 | 0.3125 |

As shown in Table 2, the retrieval results of the present invention are closer to the observation data of the actual sites, and their errors are smaller. It can be seen that for the bright ground surface area, the present invention has good retrieval results. Therefore compared with the dark pixel method, the present invention has a wider application scope.

The above is only the preferred embodiments of the invention and is not intended to limit the invention. For a person skilled in the art, the invention may have a variety of changes and modifications. Any change, equivalent replacement, improvement made within the spirit and principle of the present invention should be included in the protection scope of the invention.

The invention claimed is:

1. A method for retrieving atmospheric aerosol based on statistical segmentation, the method comprising:
   (S1) acquiring a multi-band high-resolution remote sensing image of an analyzed area using satellites, and performing radiometric calibration to obtain a multi-band remote sensing image comprising an apparent reflectance, wherein the multi-band remote sensing image comprises a mid-infrared 1.6 micrometer band and a mid-infrared 2.1 micrometer band, and selecting a blue/coast band from the multi-band remote sensing image as a retrieval band;
   (S2) inputting the multi-band remote sensing image into an atmospheric radiative transfer model, obtaining a corresponding aerosol optical thickness look-up table according to the retrieval band, wherein the look-up table comprises parameters corresponding to each aerosol optical thickness value AOT for calculating the apparent reflectance;
   (S3) for all pixels in the multi-band remote sensing image, performing categorization using a statistical segmentation method, wherein the segmentation method comprises the steps of:
   (S3.1) partitioning an apparent reflectance range of the mid-infrared 2.1 micrometer band into N segments $\varphi_n$, n=1, 2, ..., N, according to a predetermined interval $\lambda_1$;
   (S3.2) based on apparent reflectances of respective pixels in the multi-band remote sensing image in the mid-infrared 2.1 micrometer band, allocating the respective pixels into corresponding segments, to obtain pixel sets $x_n$ corresponding to respective segments $\varphi_n$;
   (S3.3) for each pixel set $x_n$ obtained in step S3.2, in condition that a number of pixels in the pixel set $x_n|x_n|\geq T_1$, $T_1$ being a predetermined threshold value, retaining the pixel set, otherwise deleting the pixel set; marking retained pixel sets as $x_{n'}$, n'=1, 2, ..., N', N' being a number of retained pixel sets;
   (S3.4) partitioning an apparent reflectance range of the mid-infrared 1.6 micrometer band into M segments $\gamma_m$, m=1, 2, ..., M, according to a predetermined interval $\lambda_2$;
   (S3.5) based on apparent reflectances of pixels in each pixel set $x_{n'}$ in the mid-infrared 1.6 micrometer band, allocating respective pixels to a corresponding segment, to obtain pixel sets $y_{n',m}$ corresponding to respective segments $\gamma_m$ in the pixel sets;
   (3.6) in condition that a number of pixels in the pixel set $y_{n',m}|y_{n',m}|\geq T_2$, $T_2$ being a predetermined threshold value, retaining the pixel set $y_{n',m}$, otherwise deleting it; marking retained pixel sets as $y_k$, k=1, 2, ..., K, K being a number of the retained pixel sets;
   (S3.7) when an apparent reflectance of a pixel in the pixel set $y_k$ in the blue/coast band $\rho_{y_{k,i}}<T$, i=1, 2, ..., $|y_k|$, $|y_k|$ being the number of pixels in the set $y_k$, T being an OTSU threshold of the apparent reflectance of the pixel set $y_k$ in the blue/coast band, allocating the pixel into a target set $Y_s$, otherwise allocating the pixel to an error categorization set $Y_t$;
   (S4) for the target set $Y_s$, acquiring the aerosol optical thickness value AOT of each pixel through the steps of:
   (S4.1) marking a p-th pixel set in the set $Y_s$ as $y_{s,p}$, p=1,2, ..., $|Y_s|$, $|Y_s|$ being a number of pixel sets in the set $Y_s$, for each pixel set $y_{s,p}$, acquiring a pixel $y_{s,p,min}$ with the minimum apparent reflectance in the blue/coast band, the pixel $y_{s,p,min}$ being a clean pixel;

(S4.2) setting an aerosol optical thickness value AOT of the clean pixel as ε, ε being a preset minimum value, retrieving a ground surface reflectivity of the clean pixel $y_{s,p,min}$ from the aerosol optical thickness look-up table generated in step S2; setting ground surface reflectivities of all pixels in the pixel set $y_{s,p}$ as being equal to the ground surface reflectivity of the clean pixel $y_{s,p,min}$;

(S4.3) retrieving aerosol optical thickness values AOTs of all pixels in the target set $Y_s$;

(S5) performing retrieval on the error categorization set $Y_t$ through the steps of:

(S5.1) traversing all pixels in the set $Y_s$, to search for pixels with no values within a predetermined radius, designating an aerosol thickness value of a pixel with no value as the aerosol thickness value of the pixel, and marking a set comprising all designated pixels $P_s$;

(S5.2) for each pixel in the set $P_s$, obtaining parameters corresponding to the designated aerosol optical thickness value from the aerosol optical thickness look-up table, and then calculating and obtaining a ground surface reflectivity of the pixel according to the apparent reflectance;

(S5.3) gridding the multi-band remote sensing image according to a predetermined side length;

(S5.4) marking a q-th pixel set in the set $Y_t$ as $y_{t,q}$, q=1, 2, ..., $|Y_t|$, $|Y_t|$ being a number of the pixel sets in the set $Y_t$; for each pixel set $y_{t,q}$, finding an intersection with $P_s$ from each grid partitioned in step S5.3, and setting the ground surface reflectivity of all pixels of the pixel set $y_{t,q}$ in a current grid as being equal to an average ground surface reflectivity value of all pixels in the intersection;

(S5.5) performing aerosol thickness value retrieval on each pixel assigned with the ground surface reflectivity in the step S5.4, to obtain the aerosol thickness value of the pixel.

2. The method for retrieving atmospheric aerosol based on statistical segmentation according to claim 1, wherein the interval $\lambda_1$ in step S3.1 is within a range of $0.002 \leq \lambda_2 \leq 0.01$.

3. The method for retrieving atmospheric aerosol based on statistical segmentation according to claim 1, wherein the interval $\lambda_2$ in step S3.4 is within a range of $0.002 \leq \lambda_2 \leq 0.01$.

4. The method for retrieving atmospheric aerosol based on statistical segmentation according to claim 1, wherein the minimum value ε in step S4.2 is 0.01.

5. The method for retrieving atmospheric aerosol based on statistical segmentation according to claim 1, wherein the retrieving method of the ground surface reflectivity in step S4.2 and step S5.2 is:

searching for respective parameters corresponding to the aerosol optical thickness value AOT of a pixel from the aerosol optical thickness look-up table and calculating the ground surface reflectivity based on the apparent reflectance of the pixel.

6. The method for retrieving atmospheric aerosol based on statistical segmentation according to claim 1, wherein in step S4.3 and step S5.5 the aerosol thickness value of each pixel is retrieved through the steps of:

obtaining parameters corresponding to each aerosol optical thickness value AOT from the look-up table, and calculating an apparent reflectance $\rho_i$ corresponding to each aerosol thickness value AOT, where i=1, 2, ..., L, L being the number of the aerosol thickness value in the look-up table; for each pixel, searching for an apparent reflectance closest to its own apparent reflectance from L apparent reflectances $\rho_i$, and setting a corresponding aerosol optical thickness value AOT as being the aerosol thickness value of the pixel.

* * * * *